(12) United States Patent
Lu

(10) Patent No.: US 9,466,089 B2
(45) Date of Patent: Oct. 11, 2016

(54) APPARATUS AND METHOD FOR COMBINING VIDEO FRAME AND GRAPHICS FRAME

(71) Applicant: ASPEED TECHNOLOGY INC., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 130 days.

(21) Appl. No.: 14/508,851

(22) Filed: Oct. 7, 2014

(65) Prior Publication Data

US 2016/0098811 A1    Apr. 7, 2016

(51) Int. Cl.
*G09G 5/00*  (2006.01)
*G06T 1/20*  (2006.01)
*H04N 19/85* (2014.01)

(52) U.S. Cl.
CPC . *G06T 1/20* (2013.01); *G09G 5/00* (2013.01); *H04N 19/85* (2014.11)

(58) Field of Classification Search
CPC ................... G09G 2340/02; G09G 2320/103; G09G 5/399; G09G 2340/10; G06F 3/1415; G06T 9/00
See application file for complete search history.

(56) References Cited

U.S. PATENT DOCUMENTS

| 5,500,933 | A | * | 3/1996 | Schnorf | G06T 11/60 345/632 |
| 5,977,960 | A | * | 11/1999 | Nally | G09G 5/14 345/501 |
| 2003/0095125 | A1 | | 5/2003 | Lim et al. | |
| 2004/0075657 | A1 | | 4/2004 | Chua et al. | |
| 2008/0165178 | A1 | | 7/2008 | Chu et al. | |
| 2009/0033670 | A1 | | 2/2009 | Hochmuth et al. | |
| 2009/0225088 | A1 | | 9/2009 | Aoki | |
| 2010/0226441 | A1 | * | 9/2010 | Tung | H04N 21/2343 375/240.24 |
| 2012/0113327 | A1 | | 5/2012 | Li et al. | |
| 2014/0125685 | A1 | | 5/2014 | Yeh et al. | |

FOREIGN PATENT DOCUMENTS

TW    201215148 A1    4/2012

\* cited by examiner

*Primary Examiner* — Hau Nguyen
(74) *Attorney, Agent, or Firm* — Muncy, Geissler, Olds & Lowe, P.C.

(57) ABSTRACT

A signal processor of the invention includes a host processor, a command queue, a graphics decoding circuit, a video decoding circuit, a composition engine and two display buffers. The host processor generates graphics commands and sets a video flag to active based on graphics encoded data, video encoded data and mask encoded data from a network. The command queue asserts a control signal according to the graphics commands. The graphics decoding circuit generates the graphics frame and two surface mask while the video decoding circuit generates the video frame and a video mask. The composition engine transfers the graphics frame, the video frame or a content of one of two display buffers to the other display buffer according to the video mask and the two surface masks when the control signal is asserted or when the video flag is active.

39 Claims, 16 Drawing Sheets

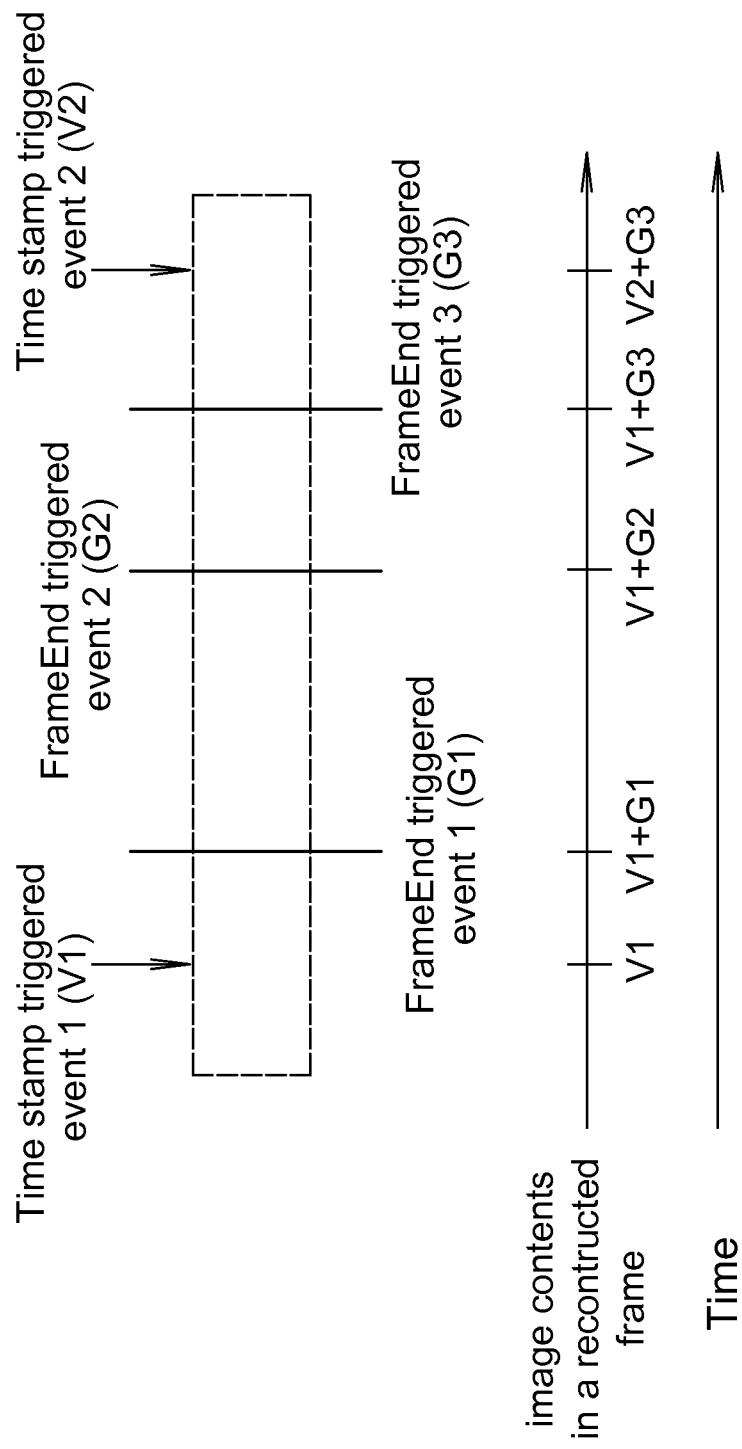

Sm(n-1)

| 0 | 0 | 0 |
|---|---|---|
| 0 | 0 | 0 |
| 0 | 0 | 0 |
| 0 | 0 | 0 |

Sm(n)

| 1 | 1 | 1 |
|---|---|---|
| 1 | 1 | 1 |
| 1 | 0 | 0 |
| 1 | 1 | 1 |

Vm(n)

| 0 | 0 | 0 |
|---|---|---|
| 0 | 0 | 0 |
| 0 | 0 | 0 |
| 0 | 0 | 1 |

Fig. 6

| case | frame update | video frame | graphics frame |
|---|---|---|---|
| Vcnt=0 and Gcnt=0 | both update | V2O | S2O |
| Vcnt=0 and Gcnt=1 | video update | V2O | O2O |
| Vcnt=0 and Gcnt>=2 | video update | V2O | No operation |
| Vcnt=1 and Gcnt=0 | graphics update | V2O | S2O |
| Vcnt>=2 and Gcnt=0 | graphics update | No operation | S2O | non-overlapped condition

Fig. 7A

|  | Frame 1 | Frame 2 | Frame 3 | Frame 4 | Frame 5 | Frame 6 |
|---|---|---|---|---|---|---|
| graphics update | Yes | Yes | Yes | Yes |  | Yes |
| video update | Yes |  |  | Yes | Yes |  |
| Gcnt | 0 | 0 | 0 | 1 | 2 | 0 |
| Vcnt | 0 | 1 | 2 | 0 | 0 | 1 |
| Sm | Sm(0) =0<br>Sm(1) !=0 | Sm(1) !=0<br>Sm(2) !=0 | Sm(2) !=0<br>Sm (3) !=0 | Sm(3) !=0<br>Sm (4) =0 | Sm(4)=0<br>Sm(5)=0 | Sm(5)=0<br>Sm(6) !=0 |
| S2O | Sm(1) | Sm(2) \| Sm(1) | Sm(3) \| Sm(2) |  |  | Sm(6) |
| O2O |  |  |  | Sm(3) |  |  |
| V2O | Vm(1) | Vm(2) |  | Vm(4) | Vm(5) | Vm(6) | non-overlapped condition

Fig. 7C

| case | frame update | video frame | graphics frame |
|---|---|---|---|
| Vcnt=0 and Gcnt=0 | both update | V2O | S2O |
| Vcnt=0 and Gcnt=1 | video update | V2O | O2O |
| Vcnt=0 and Gcnt>=2 | video update | V2O | No operation |
| Vcnt=1 and Gcnt=0 | graphics update | V2O | S2O |
| Vcnt>=2 and Gcnt=0 | graphics update | V2O | S2O | overlapped condition

Fig. 8A

| | Frame 1 | Frame 2 | Frame 3 | Frame 4 | Frame 5 | Frame 6 |
|---|---|---|---|---|---|---|
| graphics update | Yes | Yes | Yes | | | Yes |
| video update | Yes | | | Yes | Yes | |
| Gcnt | 0 | 0 | 0 | 1 | 2 | 0 |
| Vcnt | 0 | 1 | 2 | 0 | 0 | 1 |
| Sm | Sm(0) =0<br>Sm(1) !=0 | Sm(1) !=0<br>Sm(2) !=0 | Sm(2) !=0<br>Sm (3) !=0 | Sm(3) !=0<br>Sm (4) =0 | Sm(4)=0<br>Sm(5)=0 | Sm(5)=0<br>Sm(6) !=0 |
| S2O | Sm(1) | Sm(2) \| Sm(1) | Sm(3) \| Sm(2) | | | Sm(6) |
| O2O | | | | Sm(3) | | |
| V2O | Vm(1) | Vm(2) | Vm(3) | Vm(4) | Vm(5) | Vm(6) | overlapped condition

Fig. 8C

APPARATUS AND METHOD FOR COMBINING VIDEO FRAME AND GRAPHICS FRAME

BACKGROUND OF THE INVENTION

1. Field of the Invention

This invention relates to image processing, and more particularly, to an apparatus and method for combining a video frame and a graphics frame.

2. Description of the Related Art

Microsoft's MSDN library documentation, such as remote desktop protocol including graphics pipeline extension (MS-RDPEGFX), graphics device interface acceleration extensions (MS-RDPEGDI), a basic connectivity and graphics remote specification (MS-RDPBCGR), provides a description of an image remote system. The image remote system may send data through wire, and operate with a compatible client to receive, decode and render the data. In this image remote system, bitmaps may be transferred from a server to a surface on the compatible client, be transferred between surfaces, or be transferred between a surface and a bitmap cache.

As shown in FIG. 1, FIG. 1 shows a diagram of a conventional image remote system 100. In the embodiment, the image remote system 100 includes a server 101, a network 102, a client device 103, at least a peripheral device 204 and a display device 105. Here, the network 102 may be a network compliant with Microsoft RDP (Remote Desktop Protocol) specification, and the client device 103 may be a thin-client Box. The server 101 includes at least a virtual PC 101a which serves as a host computer for at least a client end (such as the client device 103). The server 101 may deliver a set of graphics encoded data containing a destination region (for a graphics frame) to the client device 103 through the network 102 according to a keyboard/mouse event from the peripheral device 104. In addition, the server 101 may deliver a set of video encoded data with a time stamp and a set of mask encoded data to the client device 103 through the network 102. Finally, the client device 103 may reconstruct a complete frame combining the video frame and the graphics frame to be displayed in a display device 105.

According to Microsoft RDP specification, a video frame is required to be displayed in the display device 105 with reference to a corresponding time stamp while a graphics command "FrameEnd" is issued in the client device 103 after a graphics frame is finished decoding. FIG. 2 is an image combining scheme used in a conventional client device. The video images generally operate at 30 frames per second (fps), but its frame rate can be adjusted according to different network bandwidths.

According to FIG. 2, video frames are decoded and stored in different video decoded buffers 201a~201c; graphics frames are decoded and stored in different graphics buffers (also called "surface buffers") 202a~202b in the client device 103. No matter which frame (video frame or graphics frame) is updated, a BitBlit/Blit function is driven to move the whole frame image data from a back buffer 203 (also called "shadow buffer" or "offscreen buffer") to primary buffer (also called "front buffer") 204 for display. FIG. 3 is an exemplary diagram showing different frame updates triggered by two time-stamp events and three FrameEnd events in the conventional client device. As to the example of FIG. 3, since there are five frame updates in total, the whole frame data of the back buffer 203 needs to be moved to the primary buffer 204 five times. It is time-consuming and bandwidth-consuming.

The scheme of FIG. 2 is called a single buffer structure. Since the single buffer architecture needs a large amount of memory access, the system performance is dramatically reduced. Another problem with a single buffer structure is a screen tearing. The screen tearing is a visual artifact where information from two or more different frames is shown in a display device with a single screen draw. For high resolution image, there is no enough time to move frame image content from one buffer to the other buffer in vertical retrace interval of display device. A most common solution to prevent screen tearing is to use multiple frames buffering, such as the double-buffering. However, the multiple frames buffering needs to store a completely frame of an image data. It may result in an increased the cost of memory and processing time.

SUMMARY OF THE INVENTION

In view of the above mentioned problem, an object of the invention is to provide a signal processor for combining video frames and graphics frames to speed up image reconstruction.

An embodiment of the invention provides a signal processor for combining a video frame and a graphics frame in an image remote system. The signal processor comprises a host processor, a command queue, a graphics decoding circuit, a video decoding circuit, a composition engine and two display buffers. The host processor generates a plurality of graphics commands based on graphics encoded data from a network and setting a video flag to active based on video encoded data and mask encoded data from the network. The command queue sequentially receives and sends the graphics commands and asserts a control signal according to the graphics commands. The graphics decoding circuit decodes the graphics encoded data according to the graphics commands and generates the graphics frame, a current surface mask and a previous surface mask. The video decoding circuit coupled to the host processor determines whether to decode the video encoded data and the mask encoded data according to the video flag to generate the video frame and a video mask. The composition engine transfers at least one of the graphics frame, the video frame and a content of one of two display buffers to the other display buffer according to the video mask and the two surface masks when the control signal is asserted or when the video flag is active. The two display buffers forms a reconstructed image according to at least one of the graphics frame, the video frame and the content of the one of two display buffers to be outputted to a display device.

Another embodiment of the invention provides a method for combining a video frame and a graphics frame in an image remote system. The method includes the following steps: generating a plurality of graphics commands according to graphics encoded data from a network and setting a video flag to active according to video encoded data and mask encoded data from the network; asserting a control signal according to the graphics commands; decoding the graphics encoded data according to the graphics commands to obtain the graphics frame, a current surface mask and a previous surface mask; determining whether to decode the video encoded data and the mask encoded data according to the video flag to obtain the video frame and a video mask; when the control signal is asserted or when the video flag is active, transferring at least one of the graphics frame, the video frame and a content of one of two display buffers to the other display buffer according to the video mask and the two surface masks; and, forming a reconstructed image according to at least one of the graphics frame, the video frame and the content of the one of two display buffers to be outputted to a display device.

Another embodiment of the invention provides an image remote system, comprising a network with a RDP protocol, a server, a client device and a display device. The server delivers graphics encoded data, video encoded data and mask encoded data through the network. The client device comprising a signal processor receives the graphics encoded data, the video encoded data and the mask encoded data to form a reconstructed image. The display device displays the reconstructed image. The signal processor configured to combine a video frame and a graphics frame comprises signal processor comprises a host processor, a command queue, a graphics decoding circuit, a video decoding circuit, a composition engine and two display buffers. The host processor generates a plurality of graphics commands based on graphics encoded data from a network and setting a video flag to active based on video encoded data and mask encoded data from the network. The command queue sequentially receives and sends the graphics commands and asserts a control signal according to the graphics commands. The graphics decoding circuit decodes the graphics encoded data according to the graphics commands and generates the graphics frame, a current surface mask and a previous surface mask. The video decoding circuit coupled to the host processor determines whether to decode the video encoded data and the mask encoded data according to the video flag to generate the video frame and a video mask. The composition engine transfers at least one of the graphics frame, the video frame and a content of one of two display buffers to the other display buffer according to the video mask and the two surface masks when the control signal is asserted or when the video flag is active. The two display buffers forms a reconstructed image according to at least one of the graphics frame, the video frame and the content of the one of two display buffers to be outputted to the display device.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 3 is an exemplary diagram showing different frame updates triggered by two time-stamp events and three FrameEnd events in the conventional client device.

FIG. 6 shows an exemplary video mask Vm(n) and two exemplary surface masks Sm(n) and Sm(n−1).

FIG. 7A is a diagram showing a relation of related parameters, video/graphics update and data transfer paths of the video decoded frame and the graphics decoded frame under non-overlapped condition.

FIG. 7C is a diagram showing the changes of related parameters and related masks in accordance with FIGS. 7A and 7B.

FIG. 8A is a diagram showing a relation of related parameters, video/graphics update and data transfer paths of the video decoded frame and the graphics decoded frame under overlapped condition.

FIG. 8C is a diagram showing the changes of related parameters and related masks in accordance with FIGS. 8A and 8B.

DETAILED DESCRIPTION OF THE INVENTION

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

The present invention adopts a composition mechanism for combining video frames and graphics frames in a non-overlapped/overlapped manner. A feature of the invention is the use of a double-buffering architecture, a video frame mask, two graphics frame masks and two parameters (Vcnt and Gcnt) to reduce data transfer from a video decoded buffer, a surface buffer or a front buffer to a back buffer, thereby to speed up the image reconstruction.

Figure 1:
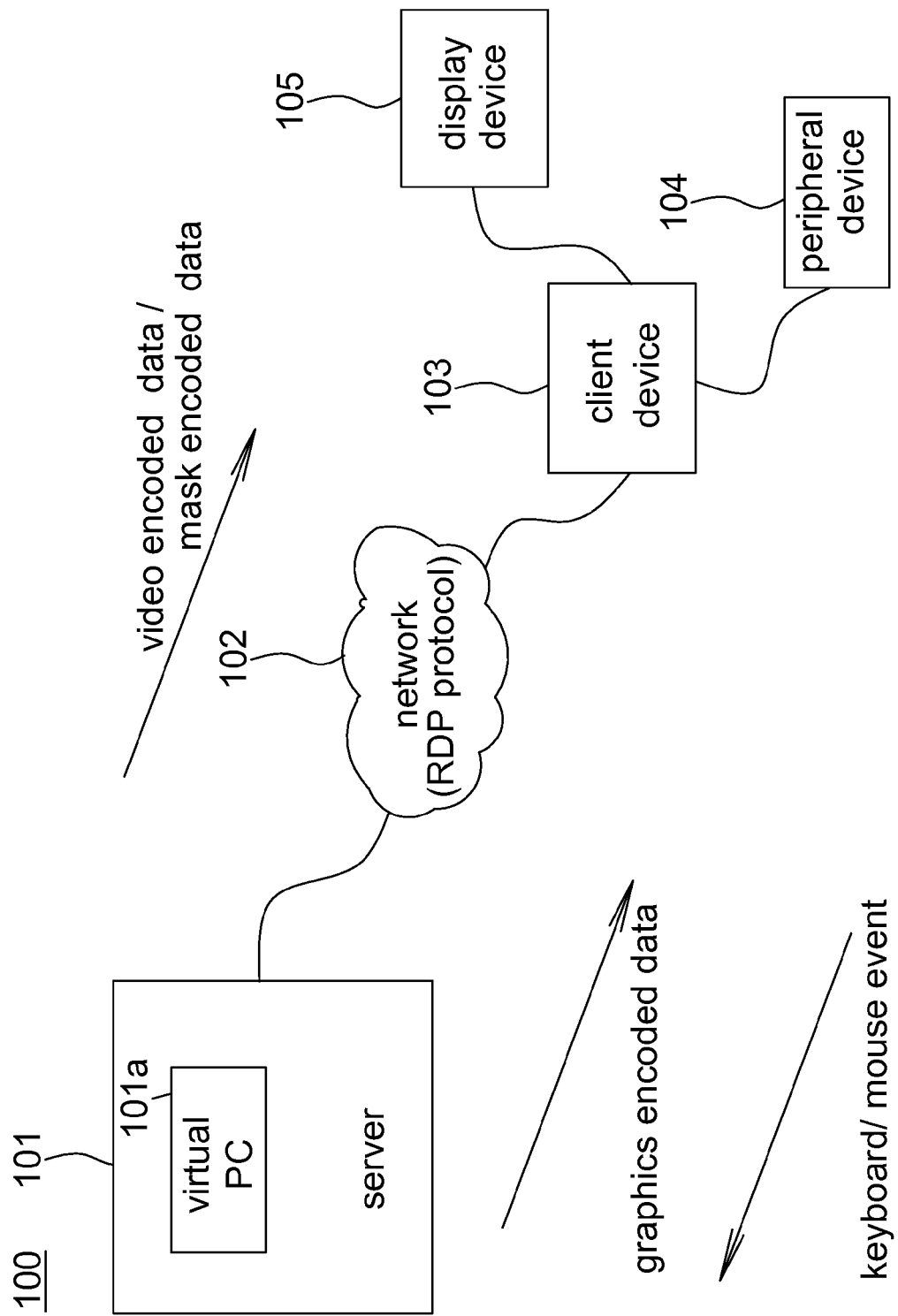
FIG. 1 is a diagram of a conventional image remote system.
Figure 2:
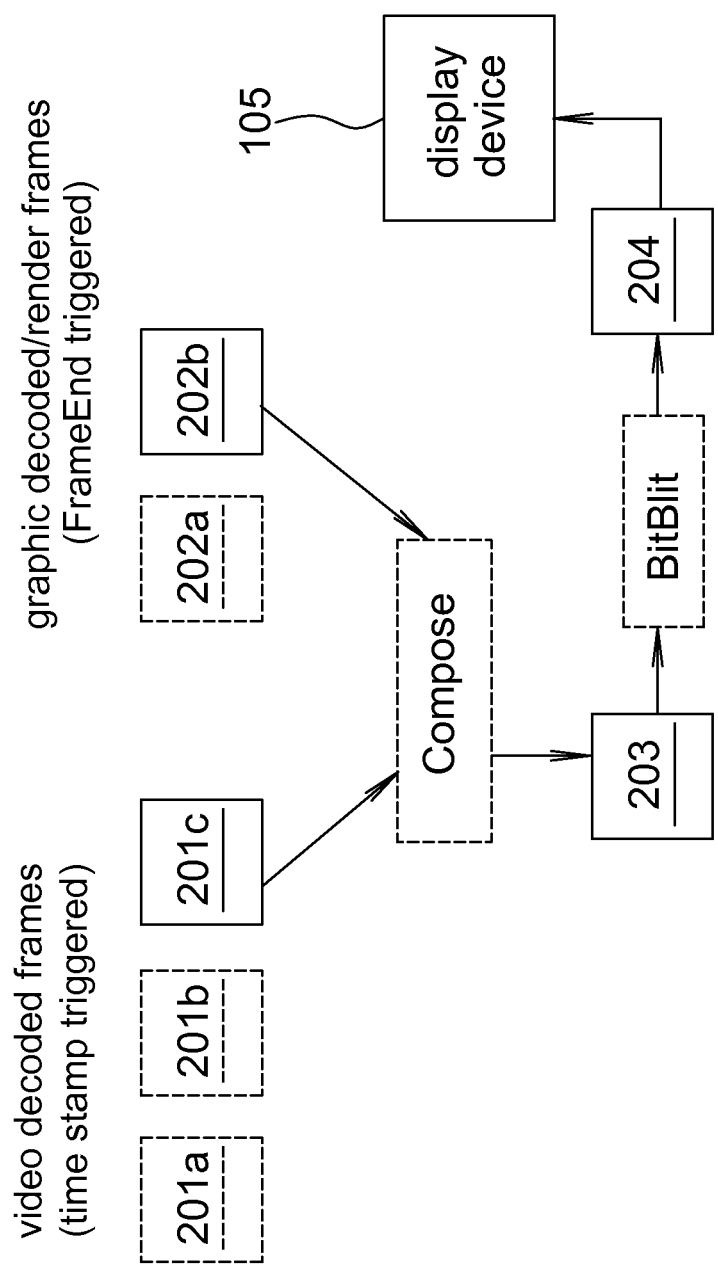
FIG. 2 is an image combining scheme used in a conventional client device.
Figure 4A:
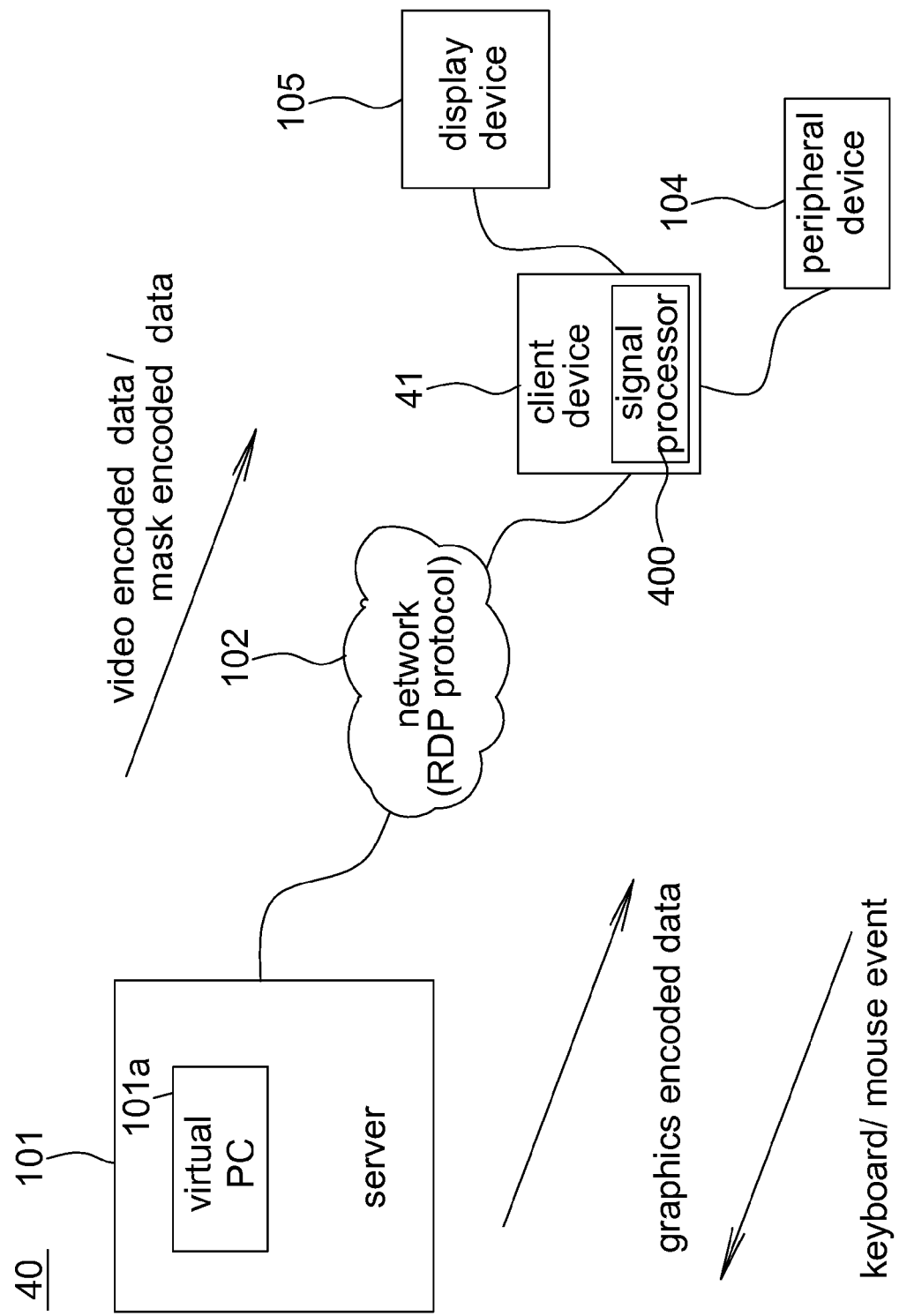
FIG. 4A shows a diagram according to an embodiment of an image remote system of the invention.

FIG. 4A shows a diagram according to an embodiment of an image remote system 40 of the invention. In the embodiment, the image remote system 40 includes a server 101, a network 102, a client device 41, at least a peripheral device 104 and a display device 105.

In an embodiment, the network 102 may be a network compliant with Microsoft RDP specification. In an embodiment, the client device 41 is a thin-client device. The client device 41 includes a signal processor 400.

The server 101 includes at least a virtual PC 101a which serves as a host computer for at least a client end (such as the client device 41). The server 101 may deliver a set of graphics encoded data containing a destination region (for a graphics frame) to the client device 41 through the network 102 according to a keyboard/mouse event from the peripheral device 104. In addition, the server 101 may deliver a set of video encoded data (for a video frame) with a time stamp and a set of mask encoded data to the client device 41 through the network 102. Finally, the client device 41 may reconstruct a complete frame according to at least one of the video frame, the graphics frame and a content of one display buffer to be displayed in a display device 105.

Figure 4B:
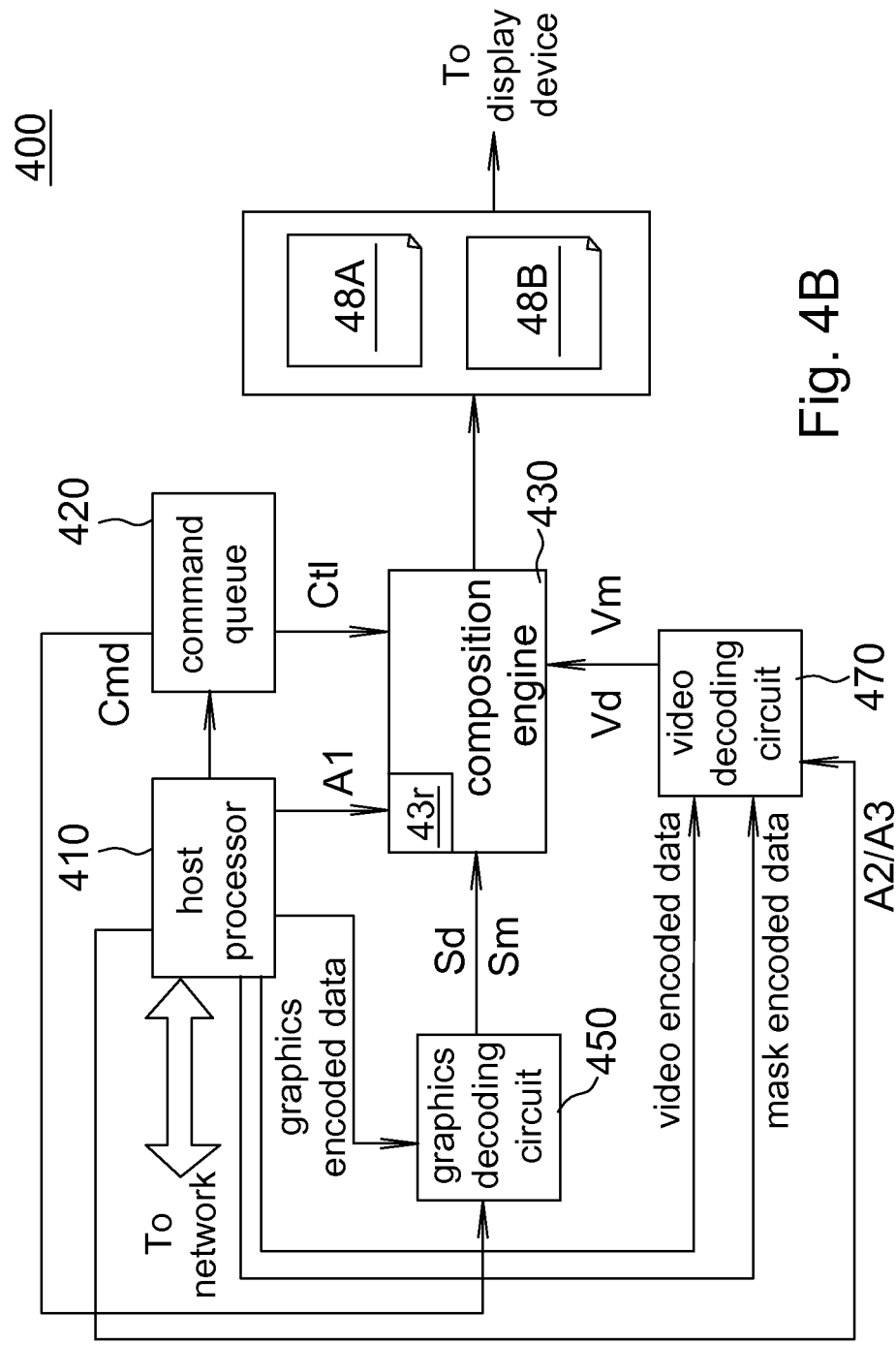
FIG. 4B shows a functional block diagram of a signal processor according to an embodiment of the invention.

FIG. 4B shows a functional block diagram of a signal processor according to an embodiment of the invention.

Referring to FIG. 4B, the signal processor 400 of the invention includes a host processor 410, a command queue 420, a composition engine 430, a video decoding circuit 470, a graphics decoding circuit 450 and two display buffers 48A and 48B.

The host processor 410 receives multiple sets of graphics encoded data, multiple sets of video encoded data, and multiple sets of mask encoded data from the network 102, each set of which includes a header. In one embodiment, according to a header of an incoming set of graphics encoded data, the host processor 410 issues related graphics commands, such as FrameEnd, to the command queue 420 and then delivers the set of graphics encoded data to the graphics decoding circuit 450. The command queue 420 includes a plurality of first-in, first-out buffers (FIFO) and stores a plurality of graphics commands to be performed by a graphics engine 552 (will be described in FIG. 5A). In particular, it is noted that a graphics command "FrameEnd" indicates a corresponding graphics frame is finished decoding in graphics decoding circuit 450. Accordingly, the command queue 420 asserts a control signal Ctl to trigger the composition engine 430 when the command "FrameEnd" is queued in the command queue 420.

In one embodiment, the host processor 410 sets a timer interrupt for a time stamp contained in the header of an incoming set of video encoded data and then delivers the set of video encoded data and its corresponding set of mask encoded data to the video decoding circuit 470. Here, the time stamp indicates when the video decoded data needs to be passed to the display device 105 for display. When the timer interrupt is raised, the host processor 410 sets a video flag to an active state. That is, the host processor 410 sets the values of registers 43r, 51r, 52r (e.g., located at addresses A1, A2, A3, respectively) (registers 51r and 52r will be described in FIG. 5B) to preset values, such as 1, through its address bus, causing the composition engine 430, the video decoder 572 and the video mask generator 575 to start operations. When the system power is on, the registers 43r, 51r, 52r are reset to their own default values other than the preset values. Please note that the preset values of registers 43r, 51r, 52r equal to 1 are provided by example and not limitation of the invention.

The two display buffers 48A and 48B are used to prevent screen tearing. At any one time, one (function as a front buffer or primary surface) of the two display buffers 48A and 48B is being scanned for displaying while the other (function as back buffer or shadow surface) of the two display buffers 48A and 48B is being drawn.

According to the invention, the composition engine 430 is triggered by a time-stamp event or a FrameEnd event to perform an image data transfer/composition. Specifically, when the composition engine 430 is triggered by a FrameEnd event (or the asserted signal Ctl, or a graphics update event), the composition engine 430 performs a graphics data transfer from a surface buffer 556 to a back buffer (one of the display buffers 48A and 48B) according to two surface masks Sm(n) and Sm(n-1); besides, when the composition engine 430 is triggered by a time-stamp event (or the preset value of register 43r, or a video update event, or an active video flag), the composition engine 430 performs a video data transfer from the video decoded buffer 573 to the back buffer according to video mask Vm(n). When the graphics data transfer is done, the control signal is de-asserted. When the video data transfer is done, the video flag is set to an inactive state. That is, the registers 43r, 51r, 52r are reset to their own default values.

Figure 5A:
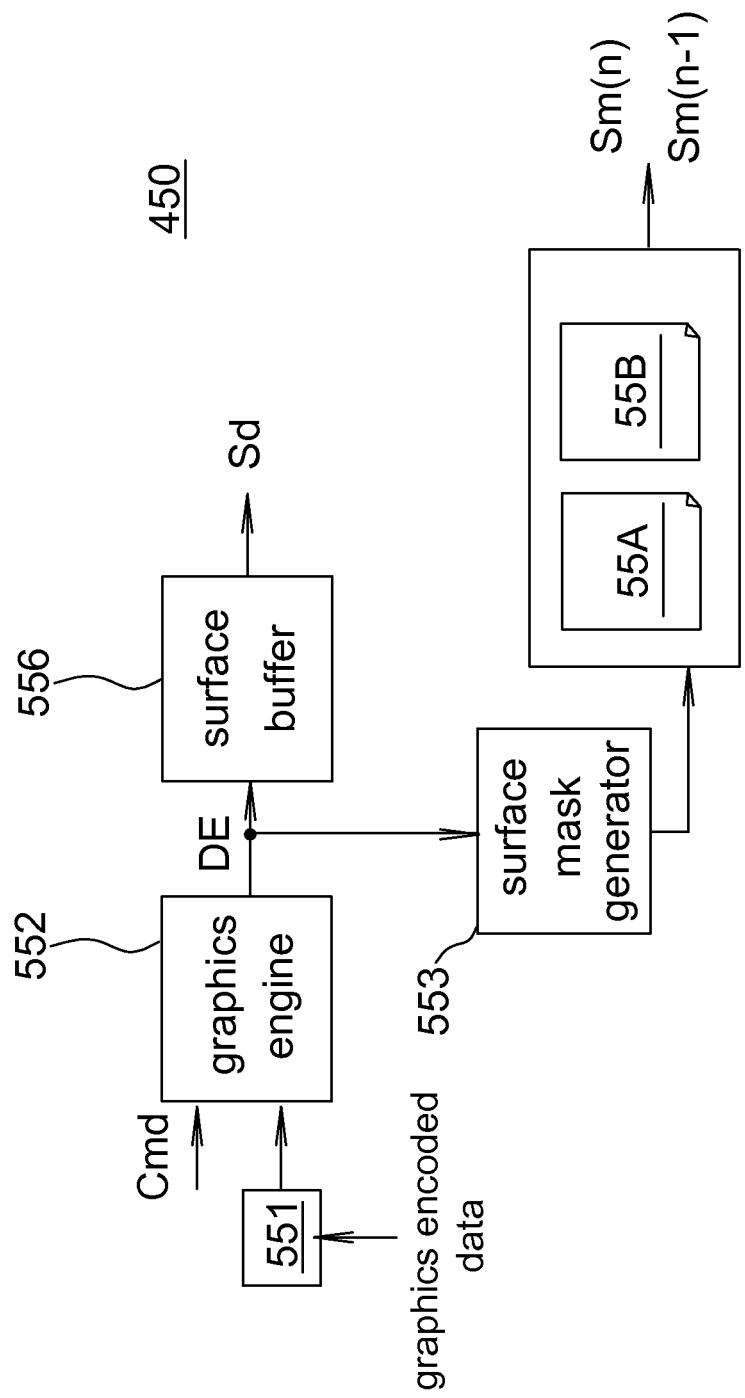
FIG. 5A shows a functional block diagram of a graphics decoding circuit according to an embodiment of the invention.

FIG. 5A shows a functional block diagram of a graphics decoding circuit according to an embodiment of the invention. Referring to FIG. 5A, the graphics decoding circuit 450 includes a buffer 551, a graphics engine 552, a surface mask generator 553, a surface buffer 556 and two surface mask buffers 55A and 55B.

The buffer 551 stores the graphics encoded data from the host processor 410. The graphics engine 552 receives a graphics command Cmd from the command queue 420 and the graphics encoded data from the buffer 551 to render a decoded image into the surface buffer 556 according to a destination region (or render region) DE contained in the graphics command Cmd. The surface mask generator 553 generates a current surface mask Sm(n) for a current graphics frame n according to the destination region DE and writes it into one of the surface mask buffers 55A and 55B. In the meantime, the surface mask generator 553 already stores a previous surface mask Sm(n-1) in the other of the surface mask buffers 55A and 55B for a previous graphics frame n-1. According to the invention, the surface masks Sm(n) and Sm(n-1) and the video mask V m(n) are bit-map masks. The number of mask values in each of the masks Sm(n-1), Sm(n) and V m(n) is equal to the number of pixels in each of the graphics frames n and n-1 and the video frame n. In the surface mask Sm(n), each pixel position is marked with one of two signs (1 or 0), indicating whether the pixel value at the corresponding position of the current graphics frame n and the previous graphics frame n-1 is altered; in the surface mask Sm(n-1), each pixel position is marked with one of two signs (1 or 0), indicating whether the pixel value at the corresponding position of the first immediately previous graphics frame n-1 and the second immediately previous graphics frame n-2 is altered. Likewise, in the video mask Vm(n), each pixel position is marked with one of two signs (1 or 0), indicating whether the pixel value at the corresponding position of the current video frame n and the previous video frame n-1 is altered. For example, in the surface masks Sm(n), mask values of 1 indicate altered pixel values at the corresponding pixel positions of the current graphics frame n and the previous graphics frame n-1 and mask values of 0 indicate unaltered pixel values at the corresponding pixel positions of the current graphics frame n and the previous graphics frame n-1. The detailed operations of the graphics engine 552, the surface mask generator 553, the surface buffer 556 and two surface mask buffers 55A and 55B are described in U.S. patent application Ser. Nos. 13/669,762 and 14/473,607 (the disclosures of which are incorporated herein by reference in their entirety).

Figure 5B:
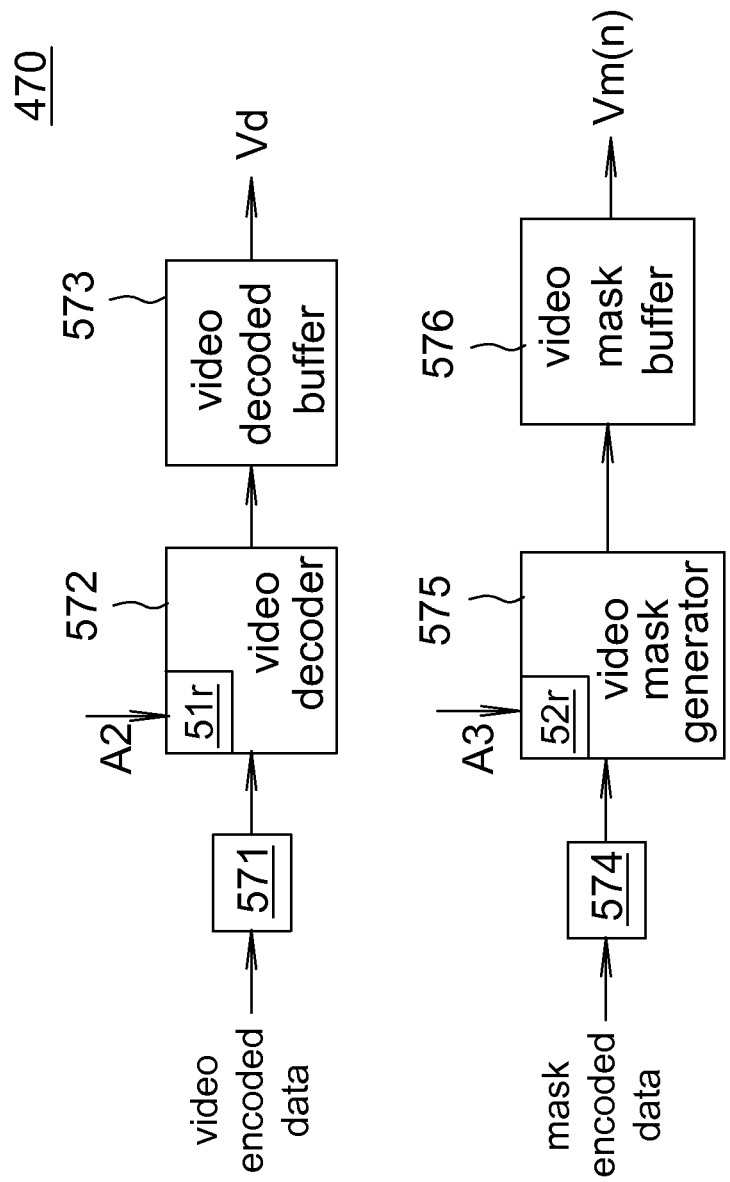
FIG. 5B shows a functional block diagram of a video decoding circuit according to an embodiment of the invention.

FIG. 5B shows a functional block diagram of a video decoding circuit according to an embodiment of the invention. Referring to FIG. 5B, the graphics decoding circuit 470 includes two buffers 571 and 574, a video decoder 572, a video decoded buffer 573, a video mask generator 575 and a video mask buffer 576.

The buffers 571 and 574 respectively stores the video encoded data and the mask encoded data from the host processor 410. When the value of register 51r is set to 1 by the host processor 410 (indicating there is a raised timer interrupt or a video update or an active video flag), the video decoder 572 decodes the video encoded data and stores a video decoded image Vd in the video decoded buffer 573. When the value of register 52r is set to 1 by the host processor 410 (indicating there is a raised timer interrupt or a video update or an active video flag), the video mask generator 575 receives the mask encoded data, generates a video mask Vm according to Microsoft RDP specification and then stores the video mask Vm in the video mask buffer 576. In one embodiment, the video mask Vm is EGT mask defined by Microsoft.

According to Microsoft RDP specification, display areas (or effective areas) of a video frame and a graphics frame in a reconstructed frame (to be displayed) are complementary. Please refer to an exemplary video mask Vm(n) and two exemplary surface masks Sm(n) and Sm(n−1) in FIG. 6. For purpose of clarity and ease of description, it is noted that the number of mask values is simplified to twelve in the video mask Vm(n) and the surface masks Sm(n) and Sm(n−1) of FIG. 6. Assuming the display area of a video frame is located in the bottom-left corner (represented by a dashed-line rectangle) of a reconstructed frame while the rest area of reconstructed frame is the display area of a graphics frame; mask values of 1 and 0 in the video mask Vm(n) respectively indicate altered pixel values and unaltered pixel values at their corresponding pixel positions of the current video frame n and the previous video frame n−1; mask values of 1 and 0 in the surface mask Sm(n) respectively indicate altered pixel values and unaltered pixel values at their corresponding pixel positions of the current graphics frame n and the previous graphics frame n−1; mask values of 1 and 0 in the surface mask Sm(n−1) respectively indicate altered pixel values and unaltered pixel values at their corresponding pixel positions of the first immediately previous graphics frame n−1 and the second immediately previous graphics frame n−2. Accordingly, the mask values are always 0 in the bottom-left corner (represented by a dashed-line rectangle) of the surface masks Sm(n) and Sm(n−1) while the mask values are always 0 in the region outside the bottom-left corner of the video mask Vm(n). The union of the two surface masks Sm(n) and Sm(n−1) determines which image region needs to be moved from the surface buffer 556 to the back buffer. By contrast, a single video mask Vm(n) determines which image region needs to be moved from the video decoded buffer 573 to the back buffer.

In order to save bandwidth, there are two ways of combining the video frame and the graphics frame to form the reconstructed frame in the back buffer as follows: (1) in a non-overlapped way: the video frame and the graphics frame are not overlapped to form the reconstructed frame in the back buffer; (2) in an overlapped way: the video frame and the graphics frame are overlapped to form the reconstructed frame in the back buffer; in particular, the video frame is disposed above the graphics frame after the whole data of the graphics frame is moved to the back buffer.

Throughout the specification and drawings, the following terms take the meanings explicitly associated herein, unless the context clearly dictates otherwise. The term "S2O" refers to a data transfer from the surface buffer 556 to the back buffer (one of the two display buffers 48A and 48B). The term "O2O" refers to a data transfer from a front buffer (one of the two display buffers 48A and 48B) to the back buffer (the other of the two display buffers 48A and 48B). The term "V2O" refers to a data transfer from the video decoded buffer 573 to the back buffer.

During operation, the composition engine 430 controls the video/graphics frame update by using two parameters Gcnt and Vcnt. Specifically, when the composition engine 430 is triggered by a graphics update without any video update, the composition engine 430 resets the parameter Gcnt to zero and increments the value of the parameter Vcnt by one; when the composition engine 430 is triggered by a video update without any graphics update, the composition engine 430 resets the parameter Vcnt to zero and increments the value of the parameter Gcnt by one.

FIG. 7A is a diagram showing a relation of related parameters, video/graphics update and data transfer paths of the video decoded frame and the graphics decoded frame under non-overlapped condition (i.e., in a non-overlapped way to combine a video frame and a graphics frame). Referring to FIG. 7A, when the composition engine 430 is triggered by both of a graphics update event (or an asserted control signal Ctl or a FrameEnd event) and a video update (or a preset value of register 43*r* or a time-stamp event, or an active video flag), the composition engine 430 resets the values of parameters Gcnt and Vcnt to 0 and performs V2O and S2O operations. Then, if the composition engine 430 is triggered by a second video update only, the composition engine 430 resets the value of parameter Vcnt to 0, sets the value of parameter Gcnt to 1 and performs V2O and O2O operations. Next, if the composition engine 430 is triggered by a third video update only, the composition engine 430 resets the value of parameter Vcnt to 0, increments the value of parameter Gcnt by 1 and performs V2O operations only. On the other hand, after the parameters Gcnt and Vcnt are reset to 0, if the composition engine 430 is triggered by a second graphics update only, the composition engine 430 resets the value of parameter Gcnt to 0, sets the value of parameter Vcnt to 1 and performs V2O and O2O operations. Then, if the composition engine 430 is triggered by a third graphics update only, the composition engine 430 resets the value of parameter Gcnt equal to 0, increments the value of parameter Vcnt by 1 and performs S2O operations only.

Figure 7B:
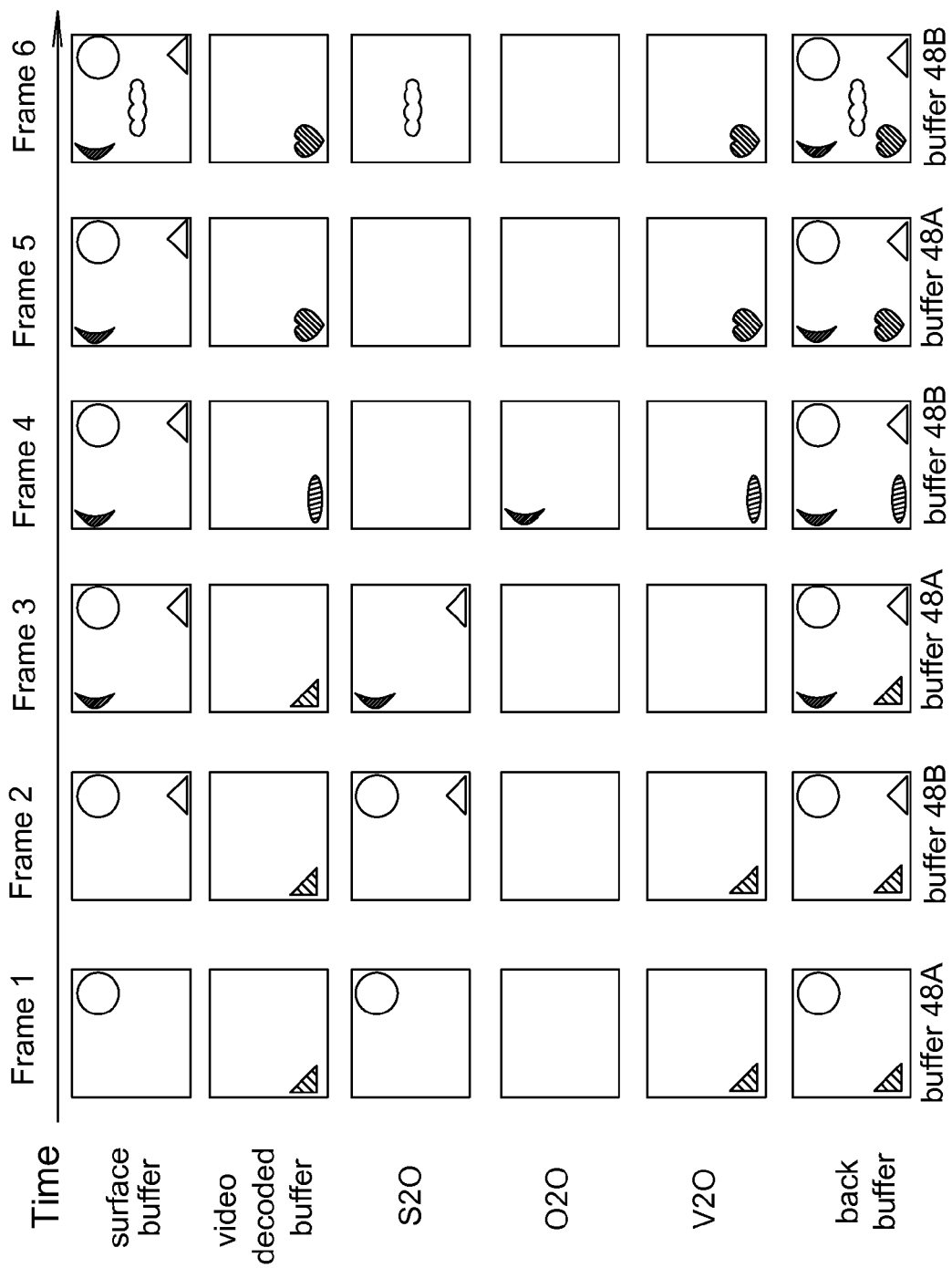
FIG. 7B shows a first exemplary frame reconstruction sequence performed by the composition engine under non-overlapped condition.

FIG. 7B shows a first exemplary frame reconstruction sequence performed by the composition engine under non-overlapped condition. FIG. 7C is a diagram showing the changes of related parameters and related masks in accordance with FIGS. 7A and 7B. The first exemplary frame reconstruction sequence is detailed with reference to FIGS. 7A and 7C. At the beginning, the mask values are set to 0 in surface mask Sm(0).

Referring to FIG. 7B, because it starts with a video update and a graphics update, the composition engine 430 resets parameters Gcnt and Vcnt to 0 and then performs S2O and V2O operations during Frame 1. That is, the composition engine 430 moves image data of a circle region from the surface buffer 556 to the back buffer 48A according to the union of surface masks Sm(0) and Sm(1) and moves image data of a hatched triangle region from the video decoded buffer 573 to the back buffer 48A according to the video mask Vm(1) during Frame 1. After Frame 1 has been reconstructed, two display buffers are swapped so that the display buffer 48A becomes the front buffer and the display buffer 48B becomes the back buffer.

During the frame reconstruction period of Frame 2, the graphics engine 552 further renders a white triangle into the surface buffer 556. Because the composition engine 430 is triggered by a second graphics update only, the composition engine 430 resets parameter Gcnt to 0, increments the value of the parameter Vcnt by one and then performs S2O and V2O operations during Frame 2. That is, the composition engine 430 moves image data of the circle region and the white triangle from the surface buffer 556 to the back buffer 48B according to the union of surface masks Sm(1) and Sm(2) and moves image data of the hatched triangle region from the video decoded buffer 573 to the back buffer 48B according to the video mask Vm(2)(=Vm(1)) during Frame 2. After Frame 2 has been reconstructed, two display buffers are swapped so that the display buffer 48B becomes the front buffer and the display buffer 48A becomes the back buffer.

During the frame reconstruction period of Frame 3, the graphics engine 552 further renders a hatched moon region and the white triangle into the surface buffer 556. Because the composition engine 430 is triggered by a third graphics update only, the composition engine 430 resets parameter Gcnt to 0, increments the value of the parameter Vcnt by one and then performs S2O operations only during Frame 3. That is, the composition engine 430 moves image data of the hatched moon region from the surface buffer 556 to the back buffer 48A according to the union of surface masks Sm(2) and Sm(3) during Frame 3. Because each of the display buffers 48A and 48B contains the hatched triangle region, no V2O operation is needed. After Frame 3 has been reconstructed, two display buffers are swapped again.

During the frame reconstruction period of Frame 4, the video decoder 572 renders a hatched ellipse region into the video decoded buffer 573. Because the composition engine 430 is triggered by a video update only, the composition engine 430 resets parameter Vcnt to 0, increments the value of the parameter Gcnt by one and then performs V2O and O2O operations during Frame 4. Besides, the mask values are set to 0 in surface mask Sm(4). That is, the composition engine 430 moves image data of the hatched ellipse region from the video decoded buffer 573 to the back buffer 48B according to the video mask Vm(4) and moves image data of the hatched moon region from the front buffer 48A to the back buffer 48B according to the surface mask Sm(3) during Frame 4. After Frame 4 has been reconstructed, two display buffers are swapped again.

During the frame reconstruction period of Frame 5, the video decoder 572 renders a hatched heart region into the video decoded buffer 573. Because the composition engine 430 is triggered by a video update only, the composition engine 430 resets parameter Vcnt to 0, increments the value of the parameter Gcnt by one and then performs V2O operations during Frame 5. That is, the composition engine 430 moves image data of the hatched heart region from the video decoded buffer 573 to the back buffer 48A according to the video mask Vm(5) during Frame 5. Because there is no graphics update, the mask values are reset to 0 in surface mask Sm(5). After Frame 5 has been reconstructed, two display buffers are swapped again.

During the frame reconstruction period of Frame 6, the graphics engine 552 renders a white cloud region into the surface buffer 556. Because the composition engine 430 is triggered by a graphics update only, the composition engine 430 resets parameter Gcnt to 0, increments the value of the parameter Vcnt by one and then performs S2O and V2O operations during Frame 6. That is, the composition engine 430 moves image data of the white cloud region from the surface buffer 556 to the back buffer 48B according to the surface mask Sm(6) and moves image data of the hatched heart region from the video decoded buffer 573 to the back buffer 48B according to the video mask Vm(6) (=Vm(5)) during Frame 6.

Figure 7D:
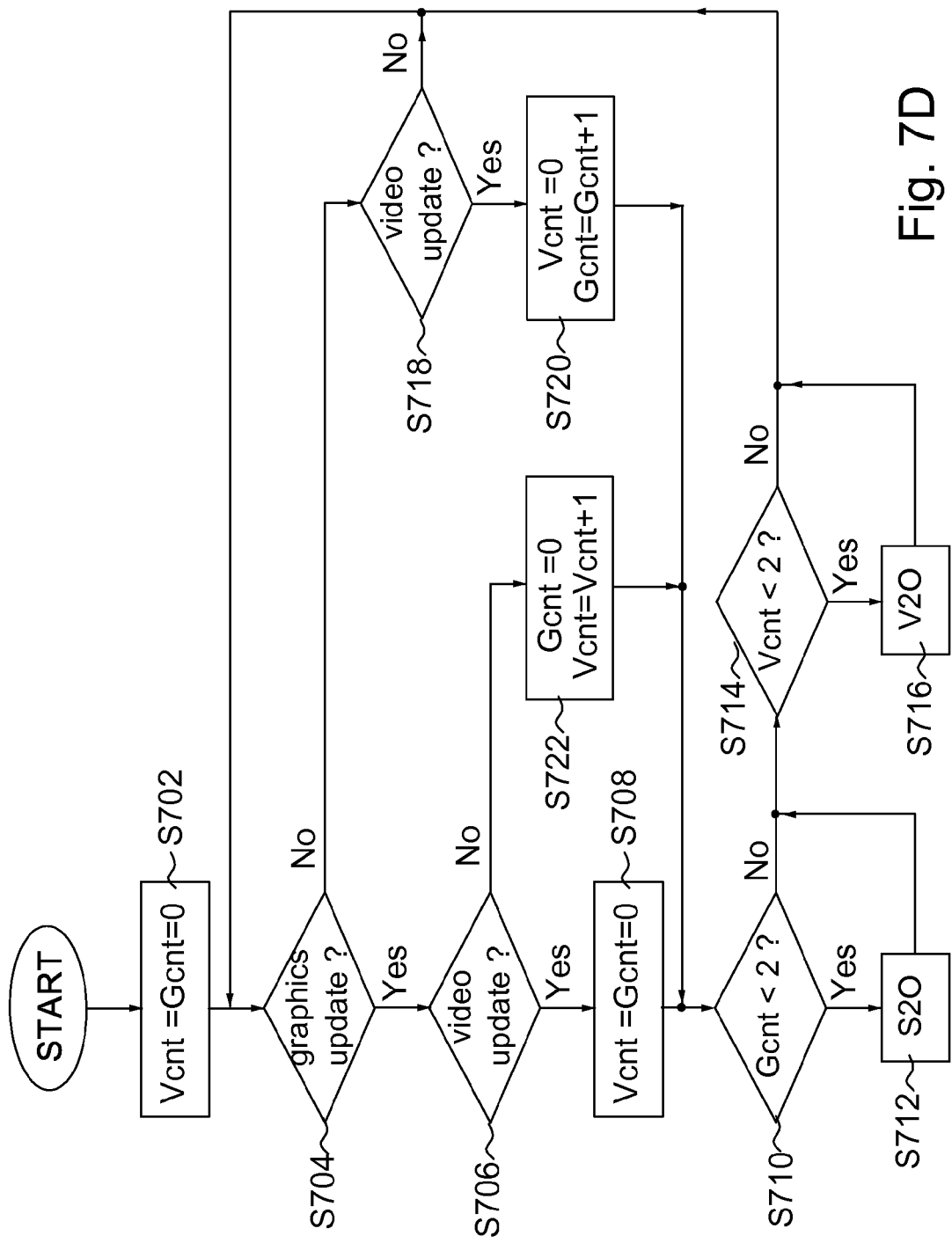
FIG. 7D is a flow chart showing a method of combining video frames and graphics frames under non-overlapped condition according to a first embodiment of the invention.

FIG. 7D is a flow chart showing a method of combining video frame and graphics frame under non-overlapped condition according to a first embodiment of the invention. Hereinafter, the method of combining video frame and graphics frame under non-overlapped condition is described with reference to FIGS. 4B, 5A-5B and 7A-7C.

Step S702: Reset the values of parameters Vcnt and Gcnt to zero.

Step S704: Is the composition engine 430 triggered by a graphics update event (or an asserted control signal Ctl, or a FrameEnd event)? If Yes, go to step S706; otherwise, the flow goes to step S718.

Step S706: is the composition engine 430 triggered by a video update event (or a preset value of register 43*r*, or a time stamp event, or an active video flag)? If Yes, go to step S708; otherwise, the flow goes to step S722.

Step S708: Reset the values of parameters Vcnt and Gcnt to zero.

Step S710: Is the value of parameter Gcnt less than 2? If Yes, go to step S712; otherwise, the flow goes to step S714.

Step S712: Perform S2O operation. That is, the composition engine 430 moves image data from the surface buffer 556 to the back buffer according to the union of surface masks Sm(n) and Sm(n−1).

Step S714: Is the value of parameter Vcnt less than 2? If Yes, go to step S716; otherwise, the flow goes to step S704.

Step S716: Perform V2O operation. That is, the composition engine 430 moves image data from the video decoded buffer 573 to the back buffer according to the video mask Vm(n).

Step S718: Is the composition engine 430 triggered by a video update event (or a preset value of register 43*r*, or a time stamp event)? If Yes, go to step S720; otherwise, the flow goes to step S704.

Step S720: Reset the value of parameter Vcnt to zero and increment the value of parameter Gcnt by one.

Step S722: Reset the value of parameter Gcnt to zero and increment the value of parameter Vcnt by one.

FIG. 8A is a diagram showing a relation of related parameters, video/graphics update and data transfer paths of the video decoded frame and the graphics decoded frame under overlapped condition (i.e., in an overlapped way to combine a video frame and a graphics frame). By comparing FIGS. 7A and 8A, there is only one difference in the case of Vcnt>=2 and Gcnt=0. As mentioned above, the video frame is disposed above the graphics frame after the whole data of the graphics frame is moved to the back buffer under overlapped condition. In this regard, no matter whether there is a video update or/and a graphics update, the composition engine 430 always performs V2O operations under overlapped condition in the final stage of frame reconstruction.

Figure 8B:
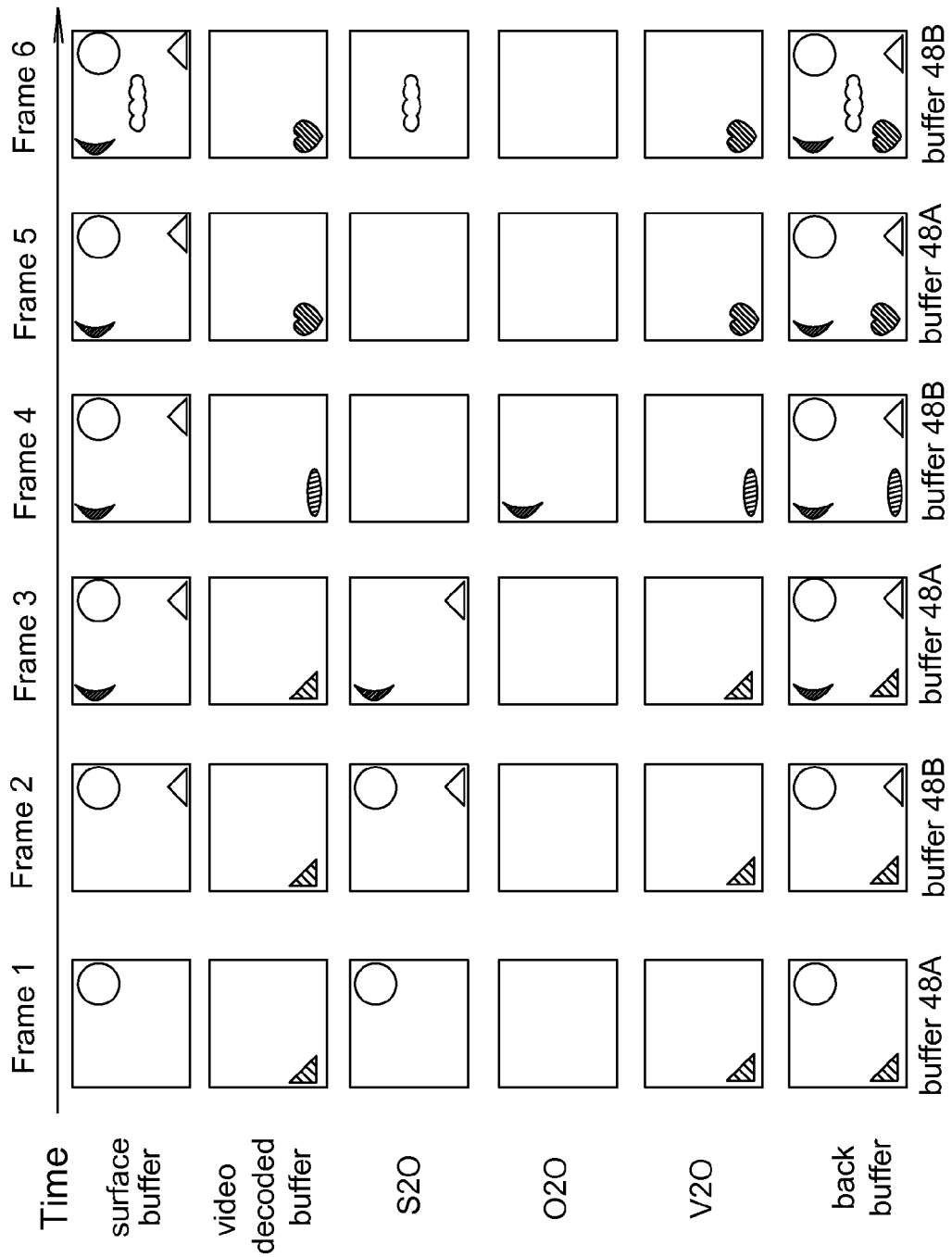
FIG. 8B shows a second exemplary frame reconstruction sequence performed by the composition engine under overlapped condition.

FIG. 8B shows a second exemplary frame reconstruction sequence performed by the composition engine under overlapped condition. FIG. 8C is a diagram showing the changes of related parameters and related masks in accordance with FIGS. 8A and 8B. In comparison with the first exemplary frame reconstruction sequence of FIGS. 7B-7C, there is only one difference in the second exemplary frame reconstruction sequence of FIGS. 8B-8C. That is, under overlapped condition, the composition engine 430 performs V2O operations in the case of Vcnt=2 and Gcnt=0 (during Frame 3), which is consistent with FIG. 8A.

Figure 8D:
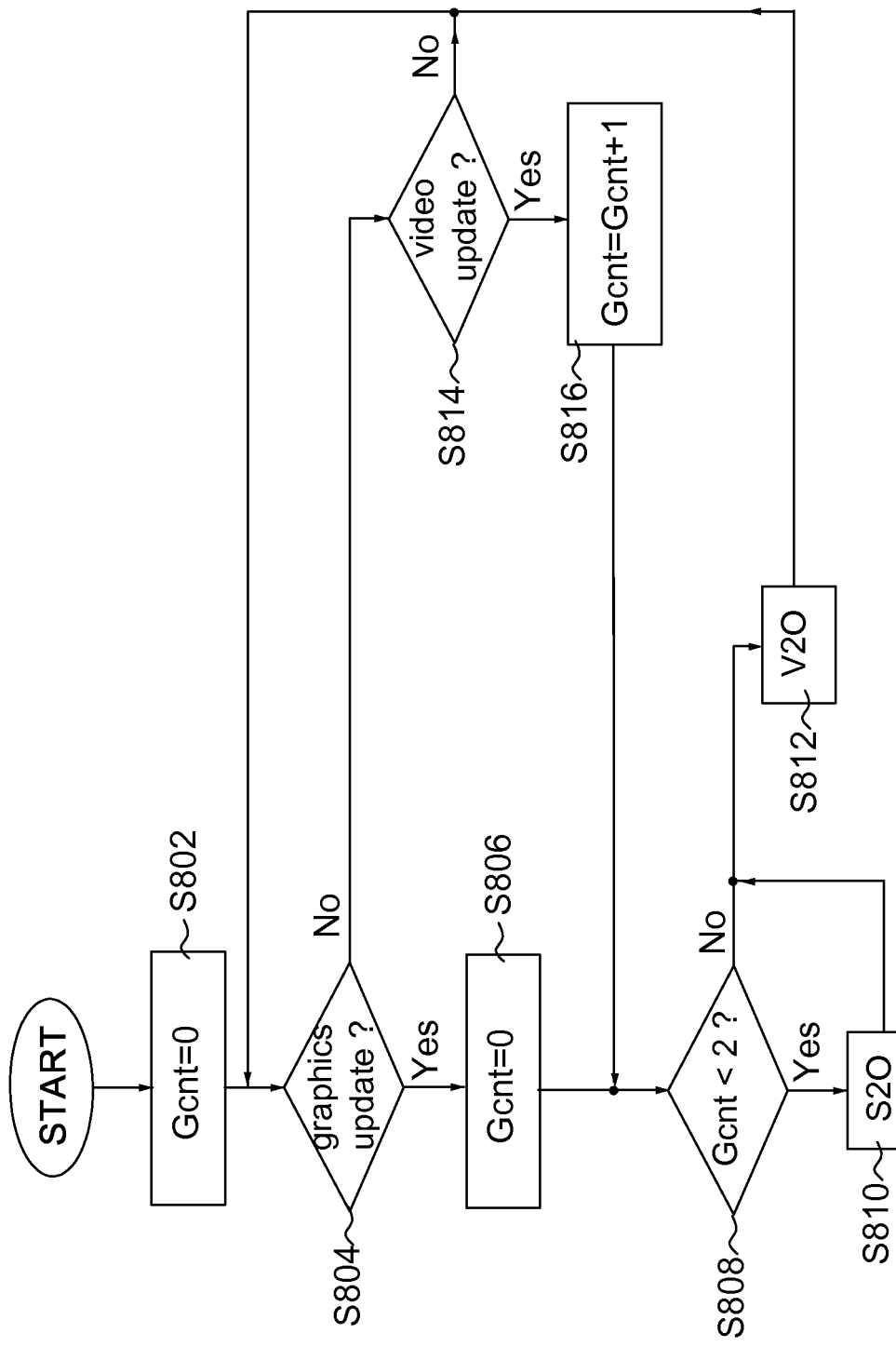
FIG. 8D is a flow chart showing a method of combining video frames and graphics frames under overlapped condition according to a second embodiment of the invention.

FIG. 8D is a flow chart showing a method of combining video frame and graphics frame under overlapped condition according to a second embodiment of the invention. Hereinafter, the method of combining video frame and graphics frame under overlapped condition is described with reference to FIGS. 4B, 5A-5B and 8A-8C.

Step S802: Reset the value of parameter Gcnt to zero.

Step S804: Is the composition engine 430 triggered by a graphics update event (or an asserted control signal Ctl, or a FrameEnd event)? If Yes, go to step S806; otherwise, the flow goes to step S814.

Step S806: Reset the value of parameter Gcnt to zero.

Step S808: Is the value of parameter Gcnt less than 2? If Yes, go to step S810; otherwise, the flow goes to step S812.

Step S810: Perform S2O operation. That is, the composition engine 430 moves image data from the surface buffer 556 to the back buffer according to the union of surface masks Sm(n) and Sm(n−1).

Step S812: Perform V2O operation. That is, the composition engine 430 moves image data from the video decoded buffer 573 to the back buffer according to the video mask Vm(n).

Step S814: Is the composition engine 430 triggered by a video update event (or a preset value of register 43r, or a time stamp event, or an active video flag)? If Yes, go to step S816; otherwise, the flow goes to step S804.

Step S816: Increment the value of parameter Gcnt by one.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A signal processor for combining a video frame and a graphics frame in an image remote system, comprising:
    a host processor for generating a plurality of graphics commands based on graphics encoded data from a network and setting a video flag to active based on video encoded data and mask encoded data from the network;
    a command queue for sequentially receiving and sending the graphics commands and asserting a control signal according to the graphics commands;
    a graphics decoding circuit for decoding the graphics encoded data according to the graphics commands and generating the graphics frame, a current surface mask and a previous surface mask;
    a video decoding circuit coupled to the host processor for determining whether to decode the video encoded data and the mask encoded data according to the video flag to generate the video frame and a video mask;
    a composition engine for transferring at least one of the graphics frame, the video frame and a content of one of two display buffers to the other display buffer according to the video mask and the two surface masks when the control signal is asserted or when the video flag is active; and
    the two display buffers for forming a reconstructed image according to at least one of the graphics frame, the video frame and the content of the one of two display buffers to be outputted to a display device;
    wherein the host processor sets the video flag to active by respectively setting a first register of the composition engine, a second register and a third register of the video decoding circuit to a first preset value, a second preset value and a third preset value through its address bus.

2. The signal processor according to claim 1, wherein the graphics frame and the video frame are not overlapped.

3. The signal processor according to claim 2, wherein when the control signal is asserted and the video flag is active, or when the control signal is asserted twice in a row and the video flag is inactive once, the composition engine transfers the graphics frame to the other display buffer according to an union of the two surface masks and transfers the video frame to the other display buffer according to the video mask.

4. The signal processor according to claim 2, wherein when the control signal is de-asserted once and when the video flag is active twice in a row, the composition engine transfers the content of the one of two display buffers to the other display buffer according to an union of the two surface masks and transfers the video frame to the other display buffer according to the video mask.

5. The signal processor according to claim 2, wherein when the control signal is asserted three times in a row and the video flag is inactive twice or more in a row, the composition engine transfers the graphics frame to the other display buffer according to an union of the two surface masks.

6. The signal processor according to claim 1, wherein when the control signal is de-asserted twice or more in a row and the video flag is active three times or more in a row, the composition engine transfers the video frame to the other display buffer according to the video mask.

7. The signal processor according to claim 1, wherein the video frame is disposed over the graphics frame.

8. The signal processor according to claim 7, wherein when the control signal is asserted and the video flag is active, or when the control signal is asserted twice or more in a row and the video flag is inactive once or more in a row, the composition engine firstly transfers the graphics frame to the other display buffer according to an union of the two surface masks and then transfers the video frame to the other display buffer according to the video mask.

9. The signal processor according to claim 7, wherein when the control signal is de-asserted once and the video flag is active twice in a row, the composition engine firstly transfers the content of the one of two display buffers to the other display buffer according to an union of the two surface masks and then transfers the video frame to the other display buffer according to the video mask.

10. The signal processor according to claim 1, wherein the current surface mask, the previous surface mask and the video mask are hit-map masks, wherein the current surface mask indicates altered pixels and unaltered pixels in a current graphics frame compared to a first immediately previous graphics frame, wherein the previous surface mask indicates altered pixels and unaltered pixels in the first immediately previous graphics frame compared to a second immediately previous graphics frame, and wherein the video mask indicates altered pixels and unaltered pixels in a current video frame compared to an immediately previous video frame.

11. The signal processor according to claim 1, wherein the video decoding circuit comprising:
    a video decoded buffer coupled to the composition engine for storing the video frame;
    a video mask buffer coupled to the composition engine for storing the video mask;
    a video decoder having the second register for decoding the video encoded data in response to the second preset value to generate the video frame to be stored in the video decoded buffer; and
    a video mask generator having the third register for decoding the mask encoded data in response to the third preset value to generate the video mask to be stored in the video mask buffer.

12. The signal processor according to claim 1, wherein the graphics decoding circuit comprising:
    a surface buffer coupled to the composition engine for storing the graphics frame;
    two surface mask buffers coupled to the composition engine for storing the current surface mask and the previous surface mask;
    a graphics engine for receiving the graphics encoded data, generating the graphics frame and storing the graphics frame into the surface buffer according to the graphics commands containing a destination region; and a surface mask generator for generating the current surface mask according to the destination region, and storing the current surface mask into one of the surface mask buffers.

13. The signal processor according to claim 1, wherein the command queue asserts the control signal when there is a "FrameEnd" command in the graphics commands.

14. The signal processor according to claim 1, wherein the host processor sets the video flag to active according to a time stamp contained in the video encoded data.

15. A method for combining a video frame and a graphics frame in an image remote system, the method comprising:
  generating a plurality of graphics commands according to graphics encoded data from a network and setting a video flag to active according to video encoded data and mask encoded data from the network;
  asserting a control signal according to the graphics commands;
  decoding the graphics encoded data according to the graphics commands to obtain the graphics frame, a current surface mask and a previous surface mask;
  determining whether to decode the video encoded data and the mask encoded data according to the video flag to obtain the video frame and a video mask;
  when the control signal is asserted or when the video flag is active, transferring at least one of the graphics frame, the video frame and a content of one of two display buffers to the other display buffer according to the video mask and the two surface masks; and
  forming a reconstructed image according to at least one of the graphics frame, the video frame and the content of the one of two display buffers to be outputted to a display device;
  wherein the step of transferring at least one of the graphics frame, the video frame and the content of one of two display buffers further comprises:
  when the control signal is de-asserted twice or more in a row and the video flag is active three times or more in a row transferring the video frame to the other display buffer according to the video mask.

16. The method according to claim 15, wherein the graphics frame and the video frame are not overlapped.

17. The method according to claim 16, wherein the step of transferring at least one of the graphics frame, the video frame and the content of one of two display buffers further comprises:
  when the control signal is asserted and the video flag is active, or when the control signal is asserted twice in a row and the video flag is inactive once, transferring the graphics frame to the other display buffer according to an union of the two surface masks and transferring the video frame to the other display buffer according to the video mask.

18. The method according to claim 16, wherein the step of transferring at least one of the graphics frame, the video frame and the content of one of two display buffers further comprises:
  when the control signal is de-asserted once and when the video flag is active twice in a row, transferring the content of the one of two display buffers to the other display buffer according to an union of the two surface masks and transferring the video frame to the other display buffer according to the video mask.

19. The method according to claim 16, wherein the step of transferring at least one of the graphics fame, the video frame and the content of one of two display buffers further comprises:
  when the control signal is asserted three times in a row and the video flag is inactive twice or more in a row, transferring the graphics frame to the other display buffer according to an union of the two surface masks.

20. The method according to claim 15, wherein the video frame is disposed over the graphics frame.

21. The method according to claim 20, wherein the step of transferring at least one of the graphics frame, the video frame and the content of one of two display buffers further comprises:
  when the control signal is asserted and the video flag is active, or when the control signal is asserted twice or more in a row and the video flag is inactive once or more in a row, firstly transferring the graphics frame to the other display buffer according to an union of the two surface masks and then transferring the video frame to the other display buffer according to the video mask.

22. The method according to claim 20, wherein the step of transferring at least one of the graphics frame, the video frame and the content of one of two display buffers further comprises:
  when the control signal is de-asserted once and the video flag is active twice in a row, firstly transferring the content of the one of two display buffers to the other display buffer according to an union of the two surface masks and then transferring the video frame to the other display buffer according to the video mask.

23. The method according to claim 15, wherein the current surface mask, the previous surface mask and the video mask are bit-map masks, wherein the current surface mask indicates altered pixels and unaltered pixels in a current graphics frame compared to a first immediately previous graphics frame, wherein the previous surface mask indicates altered pixels and unaltered pixels in the first immediately previous graphics frame compared to a second immediately previous graphics frame, and wherein the video mask indicates altered pixels and unaltered pixels in a current video frame compared to an immediately previous video frame.

24. The method according to claim 15, wherein the step of decoding the graphics encoded data comprises:
  generating the graphics frame according to the graphics encoded data and the graphics commands containing a destination region; and
  obtaining the current surface mask according to the destination region.

25. The method processor according to claim 15, wherein the step of asserting the control signal comprises:
  when there is a "FrameEnd" command in the graphics commands, asserting the control signal.

26. The method according to claim 15, wherein the step of setting the video flag to active comprises:
  setting the video flag to active according to a time stamp contained in the video encoded data.

27. An image remote system, comprising:
  a network with a RDP protocol;
  a server for delivering graphics encoded data, video encoded data and mask encoded data through the network;
  a client device comprising a signal processor for receiving the graphics encoded data, the video encoded data and the mask encoded data to form a reconstructed image; and
  a display device for displaying the reconstructed image;
  wherein the signal processor configured to combine a video frame and a graphics frame comprises:

a host processor for generating a plurality of graphics commands based on the graphics encoded data and setting a video flag to active based on the video encoded data and the mask encoded data;

a command queue for sequentially receiving and sending the graphics commands and for asserting a control signal according to the graphics commands;

a graphics decoding circuit for decoding the graphics encoded data according to the graphics commands and generating the graphics frame, a current surface mask and a previous surface mask;

a video decoding circuit coupled to the host processor for determining whether to decode the video encoded data and the mask encoded data according to the video flag to generate the video frame and a video mask;

a composition engine for transferring at least one of the graphics frame, the video frame and a content of one of two display buffers to the other display buffer according to the video mask and the two surface masks when the control signal is asserted or when the video flag is active; and the two display buffers for forming the reconstructed image according to at least one of the graphics frame, the video frame and the content of the one of two display buffers to be outputted to the display device;

wherein the host processor sets the video flag to active by respectively setting a first register of the composition engine, a second register and a third register of the video decoding circuit to a first preset value, a second preset value and a third preset value through its address bus.

28. The system according to claim 27, wherein the graphics frame and the video frame are not overlapped.

29. The system according to claim 28, wherein when the control signal is asserted and the video flag is active, or when the control signal is asserted twice in a row and the video flag is inactive once, the composition engine transfers the graphics frame to the other display buffer according to an union of the two surface masks and transfers the video frame to the other display buffer according to the video mask.

30. The system according to claim 28, wherein when the control signal is de-asserted once and when the video flag is active twice in a row, the composition engine transfers the content of the one of two display buffers to the other display buffer according to an union of the two surface masks and transfers the video frame to the other display buffer according to the video mask.

31. The system according to claim 28, wherein when the control signal is asserted three times in a row and the video flag is inactive twice or more in a row, the composition engine transfers the graphics frame to the other display buffer according to an union of the two surface masks.

32. The system according to claim 27, wherein when the control signal is de-asserted twice or more in a row and the video flag is active three times or more in a row, the composition engine transfers the video frame to the other display buffer according to the video mask.

33. The system according to claim 27, wherein the video frame is disposed over the graphics frame.

34. The system according to claim 33, wherein when the control signal is asserted and the video flag is active, or when the control signal is asserted twice or more in a row and the video flag is inactive once or more in a row, the composition engine firstly transfers the graphics frame to the other display buffer according to an union of the two surface masks and then transfers the video frame to the other display buffer according to the video mask.

35. The system according to claim 33, wherein when the control signal is de-asserted once and the video flag is active twice in a row, the composition engine firstly transfers the content of the one of two display buffers to the other display buffer according to an union of the two surface masks and then transfers the video frame to the other display buffer according to the video mask.

36. The system according to claim 27, wherein the current surface mask, the previous surface mask and the video mask are bit-map masks, wherein the current surface mask indicates altered pixels and unaltered pixels in a current graphics frame compared to a first immediately previous graphics frame, wherein the previous surface mask indicates altered pixels and unaltered pixels in the first immediately previous graphics frame compared to a second immediately previous graphics frame, and wherein the video mask indicates altered pixels and unaltered pixels in a current video frame compared to an immediately previous video frame.

37. The system according to claim 27, wherein the video decoding circuit comprising:
 a video decoded buffer coupled to the composition engine for storing the video frame;
 a mask buffer coupled to the composition engine for storing the video mask;
 a video decoder having the second register for decoding the video encoded data in response to the second preset value to generate the video frame to be stored in the video decoded buffer; and
 a video mask generator having the third register for decoding the mask encoded data in response to the third preset value to generate the video mask to be stored in the mask buffer.

38. The system according to claim 27, wherein the command queue asserts the control signal when there is a "FrameEnd" command in the graphics commands.

39. The system according to claim 27, wherein the host processor sets the video flag to active according to a time stamp contained in the video encoded data.

* * * * *